(12) United States Patent
Ahmavaara et al.

(10) Patent No.: US 7,881,270 B2
(45) Date of Patent: Feb. 1, 2011

(54) METHOD AND APPARATUS FOR FLEXIBLE NETWORK ARCHITECTURE

(75) Inventors: Kalle I. Ahmavaara, San Diego, CA (US); Lorenzo Casaccia, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 11/855,104

(22) Filed: Sep. 13, 2007

(65) Prior Publication Data

US 2008/0137592 A1 Jun. 12, 2008

Related U.S. Application Data

(60) Provisional application No. 60/844,845, filed on Sep. 14, 2006.

(51) Int. Cl.
H04B 7/212 (2006.01)
H04L 12/28 (2006.01)
(52) U.S. Cl. .................. 370/338; 370/331; 370/401
(58) Field of Classification Search .................. 370/328, 370/329, 331, 338, 401
See application file for complete search history.

(56) References Cited

U.S. PATENT DOCUMENTS

2007/0179641 A1* 8/2007 Lucas et al. .................. 700/83
2008/0031159 A1* 2/2008 Jokinen ........................ 370/255

OTHER PUBLICATIONS

International Search Report—PCT/US07/078457, International Search Authority, European Patent Office—Mar. 11, 2008.

Ericsson, Siemens, Nokia, Vodafone, Huawei, Samsung, NEC: "3GPP TSG SA WG2 Architecture ? S2#52 S2-061752, rev of S2-061920 rev of S2-061738, Shanghai, China Title: Proposed Architecture Update" 3GPP TSG SA WG2 [Online] May 12, 2006, XP002470572 Internet Publication Retrieved from the Internet: URL: http://www.3gpp.org/ftp/tsg_sa_WG2_Arch/TSG2_52_Shanghai/Docs/> [retrieved on Feb. 26, 2008].

Huawei, CMCC: "3GPP TSG SA WG2 Architecture ?SAE Ad-Hoc: S2-062706 Sourc: Standardizing interface between 3GPP Anchor and SAE Anchor" 3GPP, Aug. 26, 2006, XP002470599 Internet Publication.

Samsung, Nortel, NEC, Fujitsu: "3GPP TSG WG2 Ad Hoc: S2-063190: Proposal for way forward of SAE architecture" [Online] Aug. 25, 2006 XP002470574 Internet Publication Retrieved from the Internet: URL http://www.3gpp.org/ftp/tsg_sa_/WG2_Arch/TSGS2_54_Sophia_Antipolis/Docs/> [retrieved on Feb. 26, 2008].

Motorola: "3GPP TSG SA WG2 Architecture ? SAE Ad-Hoc: S2-062901 23 : Functional Partitioning of the SAE Anchor Under Roaming Scenarios" [Online] Aug. 25, 2006, XP002470573 Internet Publication Retrieved from the Internet: URL: http://www.3gpp.org/ftp/tsg_sa?WG2_Arch/TSGS2_54_Sophia_Antipolis/Docs/> [retrieved on Feb. 26, 2008].

(Continued)

Primary Examiner—John Pezzlo
(74) Attorney, Agent, or Firm—Francois A. Palaez; Sayed H. Beladi (57) ABSTRACT

In a method and apparatus for providing a flexible network architecture, an apparatus operable in a communication system comprises one or more logical entities adapted to provide a set of functions related to a connection through the communication system, wherein said logical entities are connected in series, and a subset of said functions are provided by each occurrence of said logical entities.

25 Claims, 8 Drawing Sheets

OTHER PUBLICATIONS

Anonymous: "Extract from 3GPP TR 23.882 V1. 4. 0 (Sep. 2006) technical Report 3rd Generation Partnership Project; Technical Specification Group Services and System Aspects; 3Gpp System Architecture Evolution: Report on technical Options and Conclusions (Release 7), pp. 1, 12-18" 3GPP [Online] Sep. 12, 2006, XP002470571 Internet Publication Retrived from the Internet: URL: ftp://ftp.3gpp.org/specs/archive/23_series/23.882/> [retrieved on Feb. 26, 2008].

Written Opinion; PCT/US2007/078457—International Search Authority—European Patent Office, Mar. 11, 2008.

International Preliminary Report on Patentability; PCT/US2007/078457—The International Bureau of WIPO—Geneva, Switzerland, Mar. 17, 2009.

* cited by examiner

METHOD AND APPARATUS FOR FLEXIBLE NETWORK ARCHITECTURE

CROSS-REFERENCE TO RELATED APPLICATION

This application claims the benefit of U.S. Provisional Application Ser. No. 60/844,845, filed on Sep. 14, 2006, and entitled "METHOD AND APPARATUS FOR FLEXIBLE NETWORK ARCHITECTURE." The entirety of this application is incorporated herein by reference.

BACKGROUND

I. Field

The present invention relates generally to wireless communications, and more specifically to flexible network architecture.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

There is generally pressure to simplify network architectures and go towards one-node configurations, especially for userplane handling. However, in roaming cases both a visited network and a home network must be able to process the user data (for policy control, counting for charging, lawful intercept, filtering, etc.). This leads to an architecture where there is one userplane node in the visited network and another one in the home network. In non-roaming cases these two nodes are still present and their functions are overlapping. Moreover, interfaces from the remaining of the system to these two user plane nodes have to be created, causing double amount of interfaces with very similar characteristics. There is therefore a need for simplification of this network architecture.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, an apparatus operable in a communication system comprises one or more logical entities adapted to provide a set of functions related to a connection through the communication system, wherein said logical entities are connected in series, and a subset of said functions are provided by each occurrence of said logical entities.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. However, it may be evident that such embodiment(s) may be practiced without these specific details. In other instances, well-known structures and devices are shown in block diagram form in order to facilitate the description of one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

For clarity, certain aspects of the techniques are described below for LTE, and LTE terminology is used in much of the description below.

Embodiments herein described are related to 3GPP's System Architecture Evolution (SAE), but they can also be related to any network architecture requiring a flexible configuration. In general there is pressure to simplify network architectures and go towards one-node configurations especially for userplane handling. On the other hand, in roaming cases, both the visited and home network must be able to process the user data (for policy control, counting for charging, lawful intercept, filtering, etc.). This leads to an architecture where there is one userplane node in a visited network and one in a home network. In non-roaming cases these two nodes are still present and their functions overlap. Moreover, the interfaces from other parts of the system to these two user plane nodes have to be created, causing double the amount of interfaces with very similar characteristics.

The embodiments herein described create a single user plane node, that for normal non-roaming connections is the only node needed, but for some given connections (e.g. roaming case) these nodes can be connected in series such as, e.g., one node in the visited network and one node in the home network. This greatly simplifies the architecture because:
—only one set of interfaces from other parts of the system have to be created—when there is no need for more than one node (e.g. local connections) one user plane node can be used—when there is a need (e.g. roaming connections) two user plane nodes can be used.

In typical systems, two different logical nodes are created for the system architecture. One for the Visited Network and another for the Home Network. Even in this case these logical nodes can be implemented in a single box, but from specification point of view there is still two nodes and extra complexity.

For 3GPP System Architecture Evolution, just one core network user plane node is created and called a "SAE anchor". In normal cases (non roaming, single service access) there is just one SAE anchor used for a connection, but for some connections two SAE anchors may be connected in series. This is needed for example in roaming cases when both visited network and home network need to access the user data. Also in roaming case the series connected nodes can isolate the local mobility within one node and the other node has to get involved only for global roaming. This approach simplifies the specification effort and the architecture. This approach also removes the complexity from simple non roaming connections while allowing the benefits of two node configurations for roaming connections.

In the embodiments described herein only one user plane node needs to be defined. This simplifies the system architecture. By connecting two of these single nodes in series the benefits of two node configurations can be taken into use selectively. For most connections there is no need to connect two nodes in series, and one node is enough. So the embodiments achieve the benefits of both single and two node configurations without the drawbacks of either.

Figure 1:
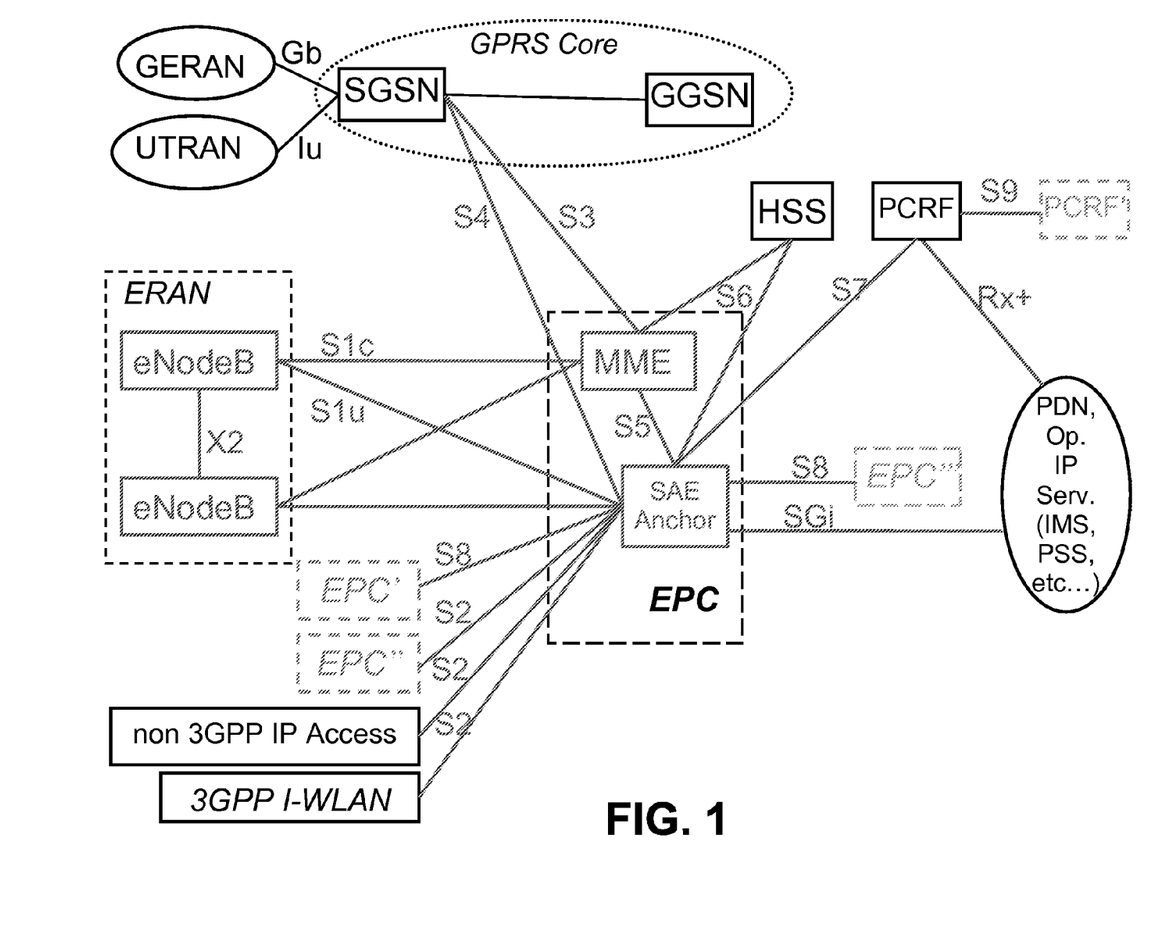
FIG. 1 illustrates an embodiment of a generic 3GPP architecture.

With reference now to FIG. 1, in a generic architecture there is just one user plane node in the Enhanced Packet Core (EPC) network. Here it is called SAE anchor, but it could also be a GGSN, an enhanced GGSN, etc. The user data from/to the connected mobile device (a.k.a. User Equipment, UE, handset, Mobile Node, AT, etc.) traverses the user plane node "SAE Anchor".

The necessary and desired functions to be performed for the user data traversing the EPC are done within the SAE anchor. These functions may include e.g.:

Policy control: SAE anchor receives policies describing the policies to be applied for the traversing user data. These policies typically come from an external source, like the PCRF (Policy Control Function, Policy and Charging Rule Function, etc), HSS or other control element. SAE anchor enforces the received policies towards the user plane by allowing, denying, modifying or/and filtering the traversing user data. SAE anchor may also translate the policy to a policy applicable to another node within the user data path and pass policy towards the other policy enforcement point.

Subscriber Profile handling: SAE anchor may receive subscriber profiles from an external source. Subscriber profiles may define what type of connectivity is allowed for the connected user, e.g. into which packet data networks it is allowed to connect. The subscriber profile may also include the stored usernames and passwords that are required from the UE in order to access certain Packet Data Networks (PDN). The subscriber profile may also contain other information impacting the handling or/and routing of the user data through SAE anchor.

Charging: SAE anchor reports charging information to charging entities based on the characteristics of the traversing user data. E.g. reporting the volumes of traversing user data. The reports may be divided into different categories based on the contents of the traversing user data or its source or/and destination address.

User Data Switching and Routing: SAE anchor is responsible for forwarding, switching or/and routing the traversing user data towards the next node in the user data path. For this purpose it has specific mobility and/or transport protocols.

There may be also other functions handled by SAE anchor.

Figure 2:
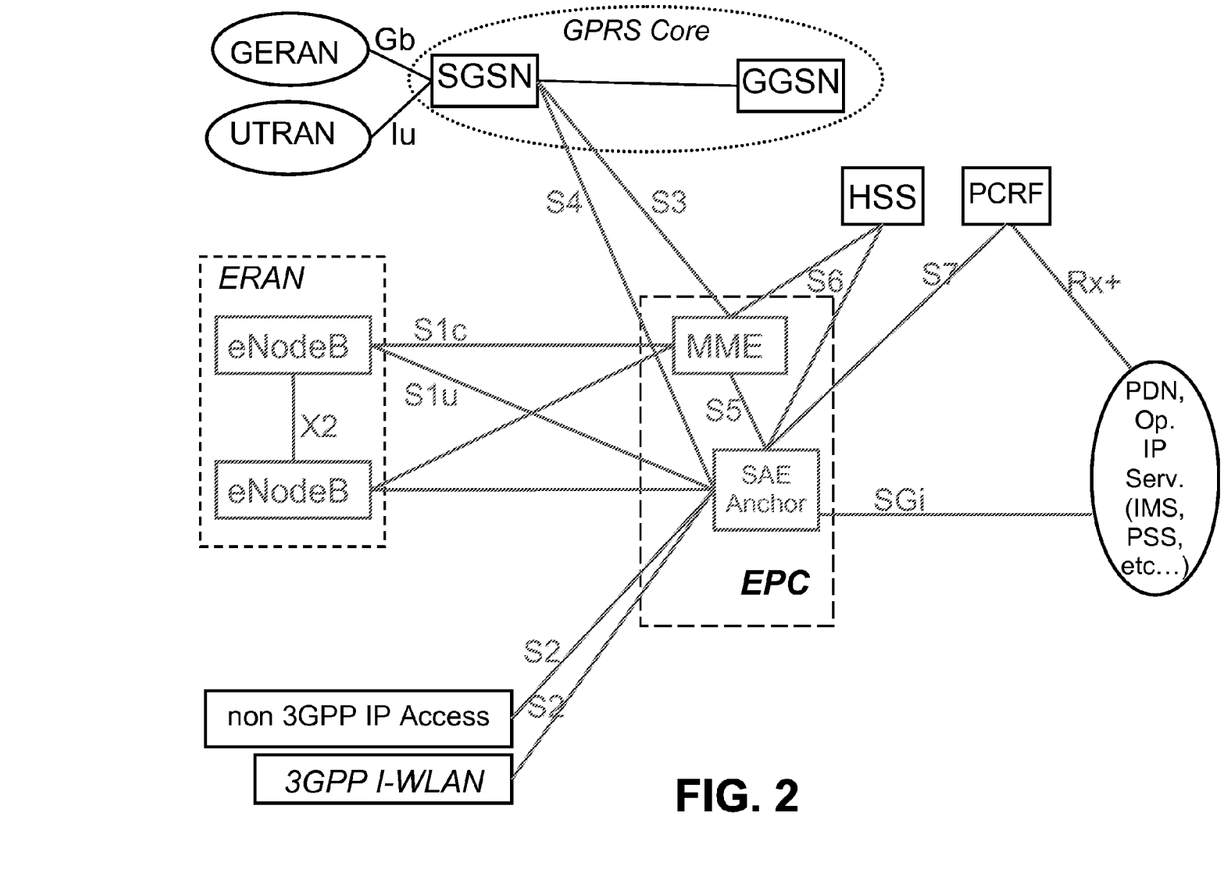
FIG. 2 illustrates an exemplary embodiment of architecture applied for a non-roaming user.

With reference now to FIG. 2, in this non-roaming case just one SAE anchor is used for the traversing user data. This means that user data processing is concentrated in a single node. This simplifies the architecture, since the interfaces to support the SAE functions have to be terminated only in that single SAE anchor node. There is no need to have duplicated user data processing functions nor duplicated interfaces within the EPC.

Figure 3:
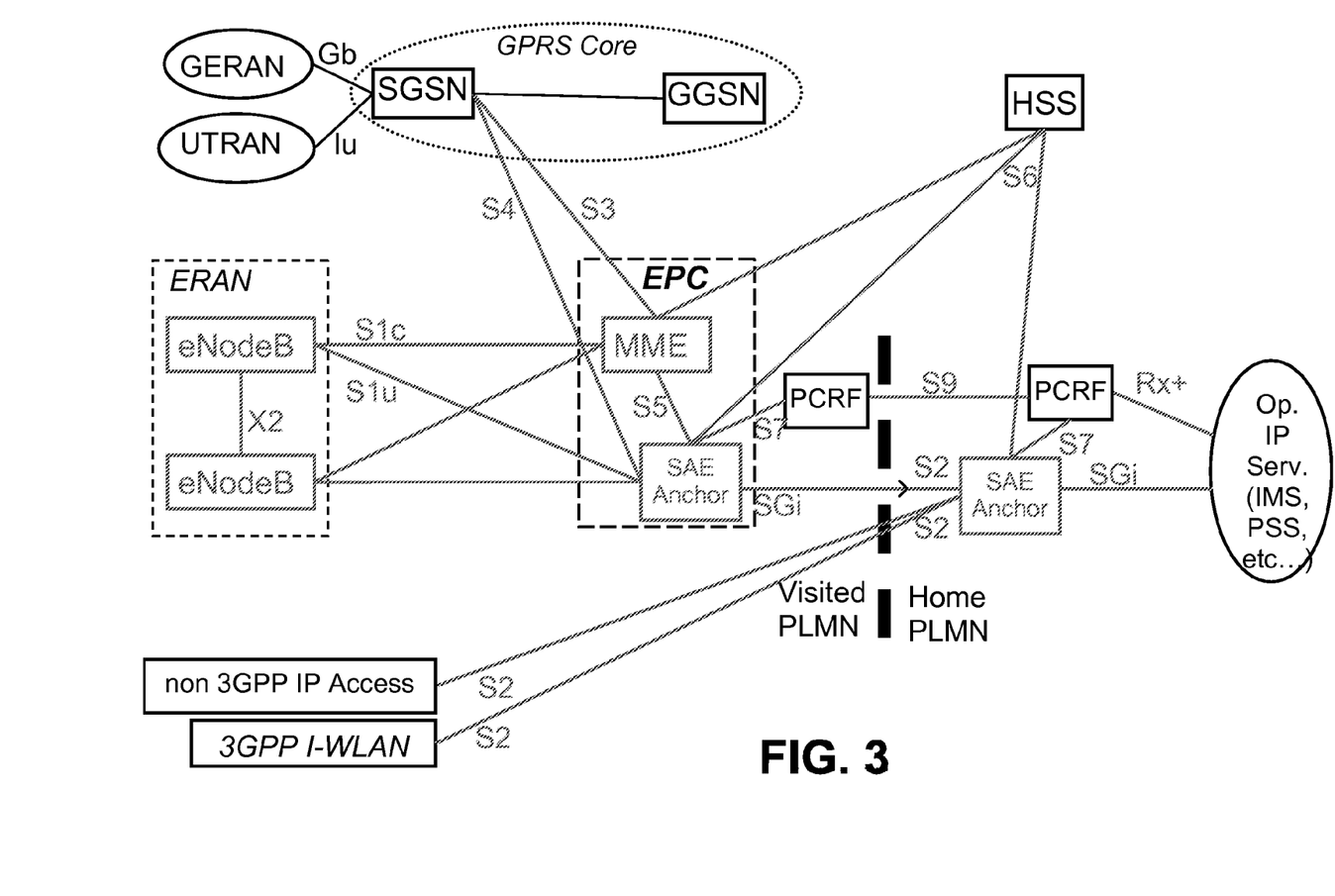
FIG. 3 illustrates an exemplary embodiment of architecture applied for a roaming user.

With reference now to FIG. 3, in this roaming case two instances of SAE anchor are visible. This means that the user plane processing functions can reside, as typically required, in two places e.g. both in the visited network and in the home network. This solution allows having two nodes for the user plane processing functions when such a distribution is needed. As seen from FIG. 2, which depicts a non-roaming case, it is not mandated to have these two nodes operating when there is no need. Also, usage of the same logical node twice, instead of defining two different user plane nodes for the roaming case reduces the amount of interfaces between EPC nodes and rest of the system. For instance, the intertfaces to PCRF, HSS, charging system, etc., do not have to be connected to two logical nodes. One logical node is enough, with the possibility to have multiple occurrences of the single node in the data path.

It is possible to have multiple (more than two) SAE anchors connected in series. It is also possible to use multiple user plane nodes in series in other than roaming cases, such as, e.g., cases with long physical distances between the mobile and the typical location of the SAE anchor, or in case of accessing several packet data networks from a single mobile device.

Figure 4:
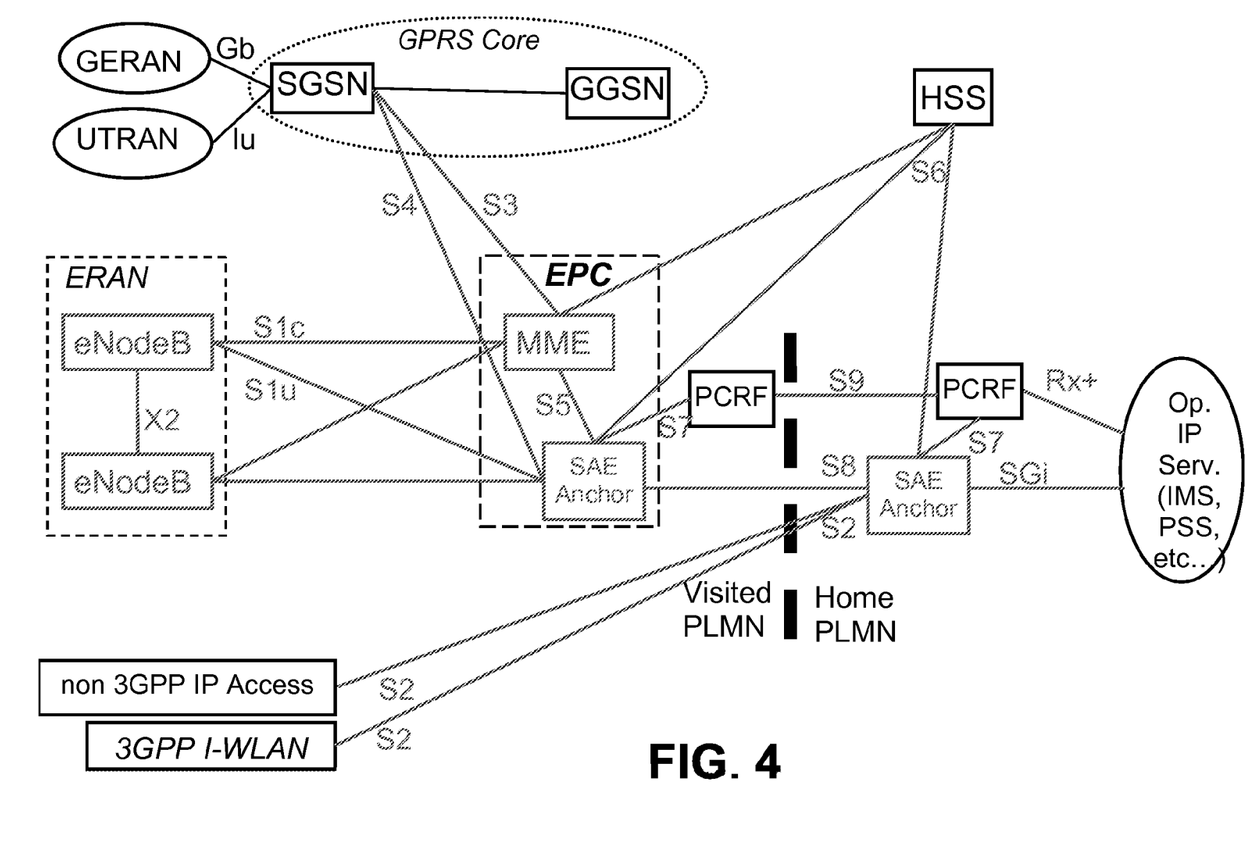
FIG. 4 illustrates another exemplary embodiment of architecture applied for a roaming user.

With reference now to FIG. 4, an example similar to the one depicted in FIG. 3 in here illustrated, except that a different protocol between the SAE anchors is used for mobility, transport and switching. The connecting protocol between series-connected SAE anchors may be, e.g., GTP, Mobile IP, GRE, IP, PMIP, Enhanced GTP, or any other suitable protocol. It may also any protocol derived from these mentioned protocols.

Figure 5:
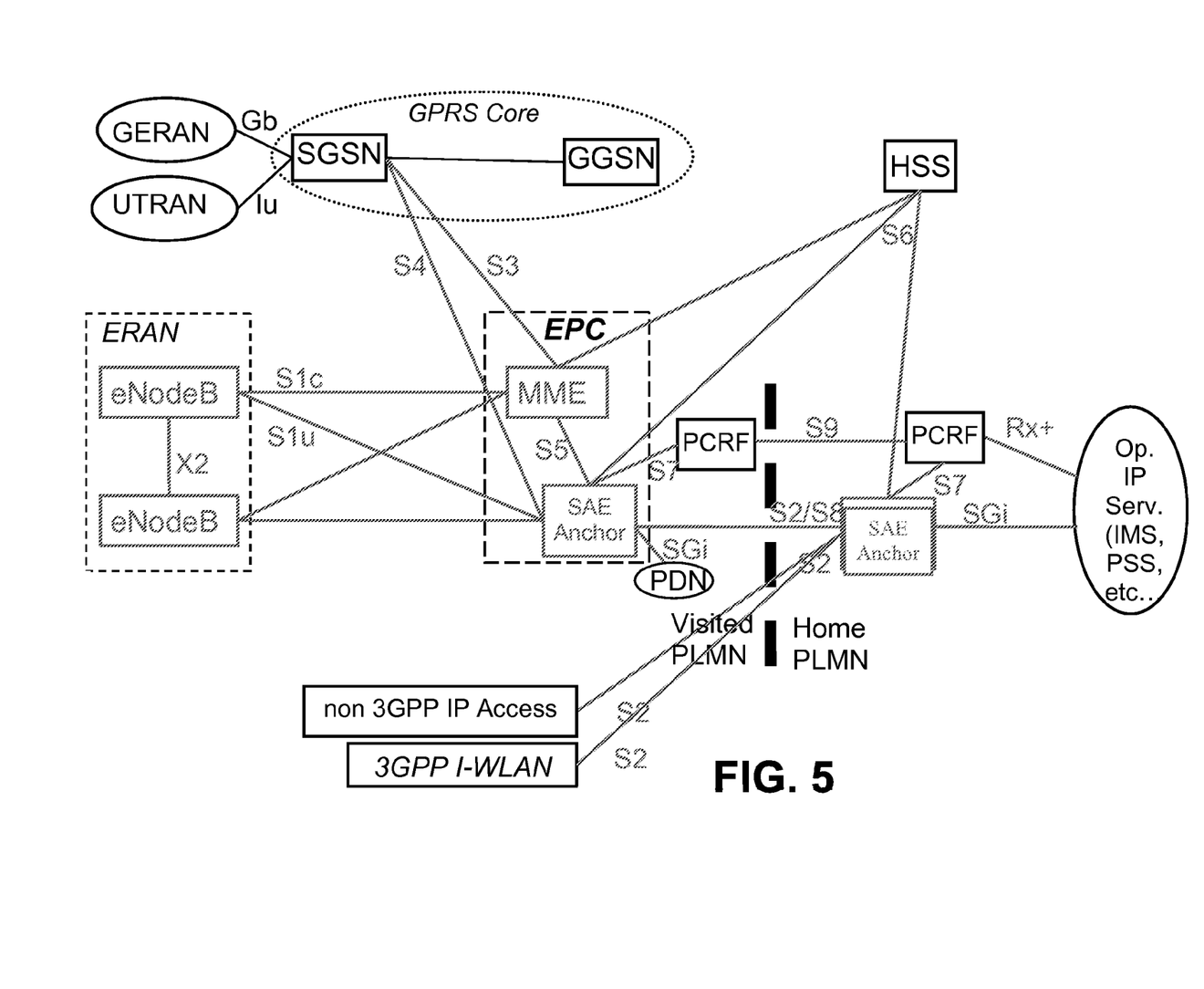
FIG. 5 illustrates an exemplary embodiment of architecture applied for a roaming user with a local breakout.

With reference now to FIG. 5, this example shows that the occurrences of SAE anchors may be different for different data flows within the user data. In this example some of the user data is routed away from the EPC systems from the first SAE anchor. This is typically done for connecting to local services, or services that can be better accessed from a local network. These services may be, e.g., local services, IMS services, emergency calls, internet connectivity, etc.

Figure 6:
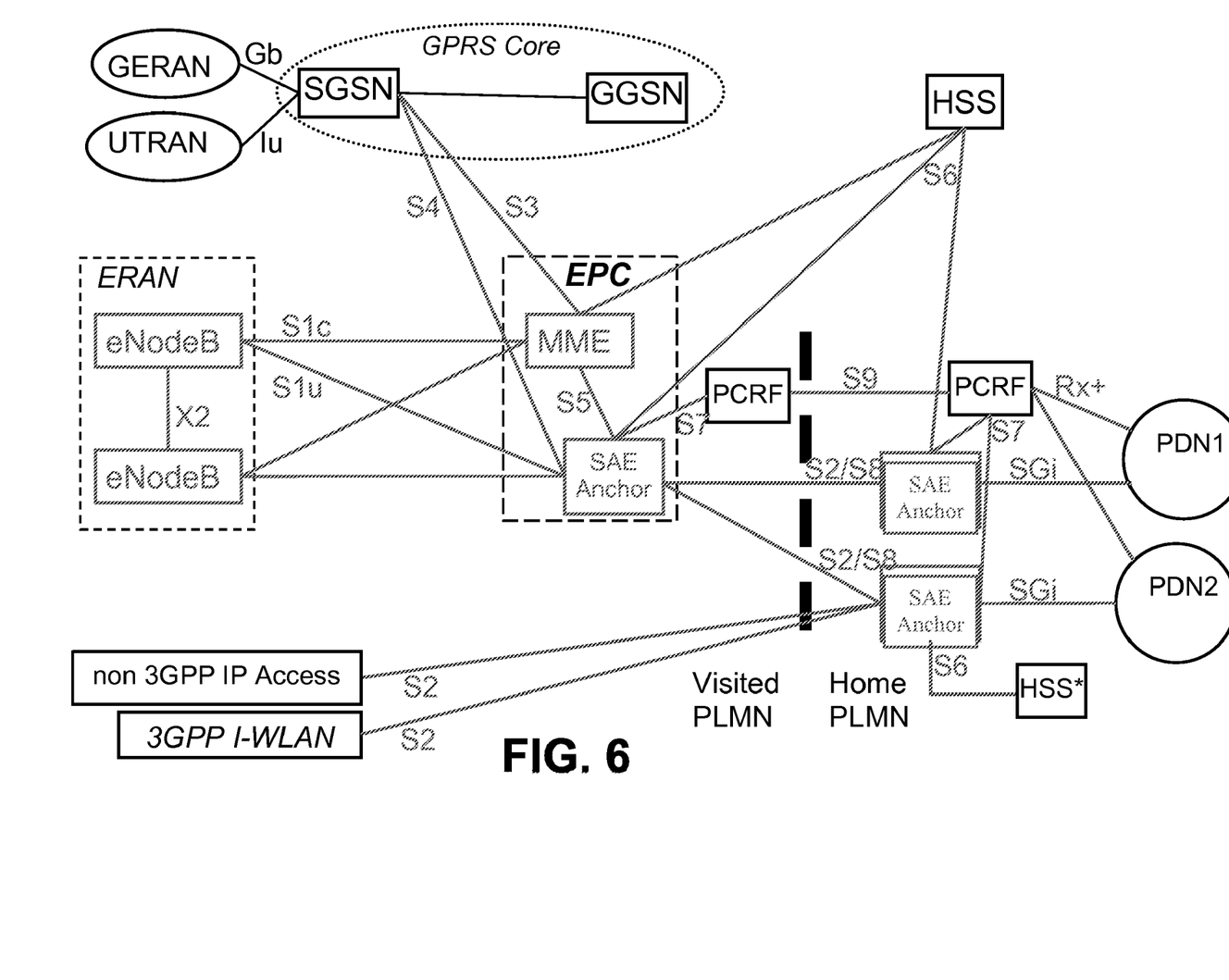
FIG. 6 illustrates an exemplary embodiment of architecture applied for a roaming user with connections to two PDNs.

With reference now to FIG. 6, this example shows two different series connection occurrences of SAE anchors. The series connection mechanism can also be used to connect part of the user data flows towards multiple SAE anchors. One flow is routed/switched/forwarded from one SAE anchor to a second SAE anchor at one location. In the same time another flow from the same user device is routed from the one SAE anchor to a third SAE anchor. This enables service or PDN specific handling of user data flows at the second or/and third SAE anchor. This enables also connectivity to single or multiple PDNs, enterprise networks or/and specific services, each with their dedicated SAE anchor node.

Figure 7A:
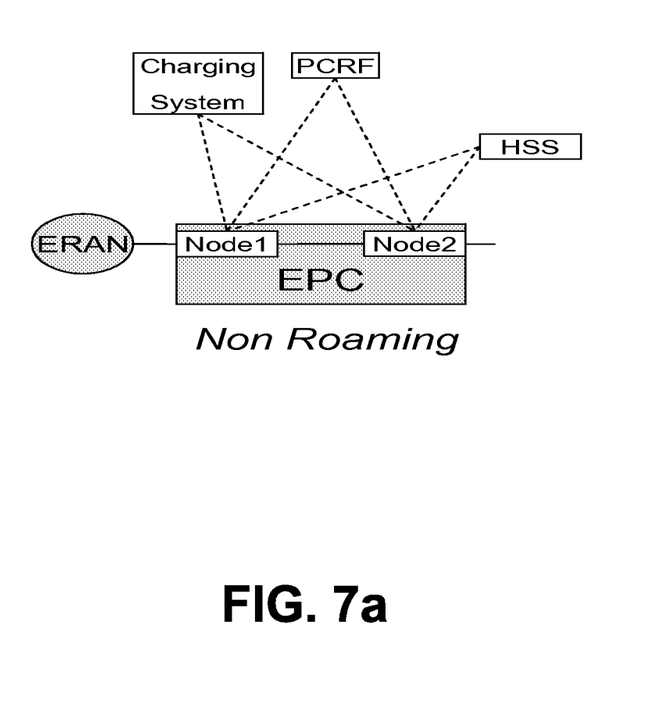
FIGS. 7a and 7b illustrates an exemplary SAE architecture with two distinct logical nodes Node 1 and Node 2.
Figure 7B:
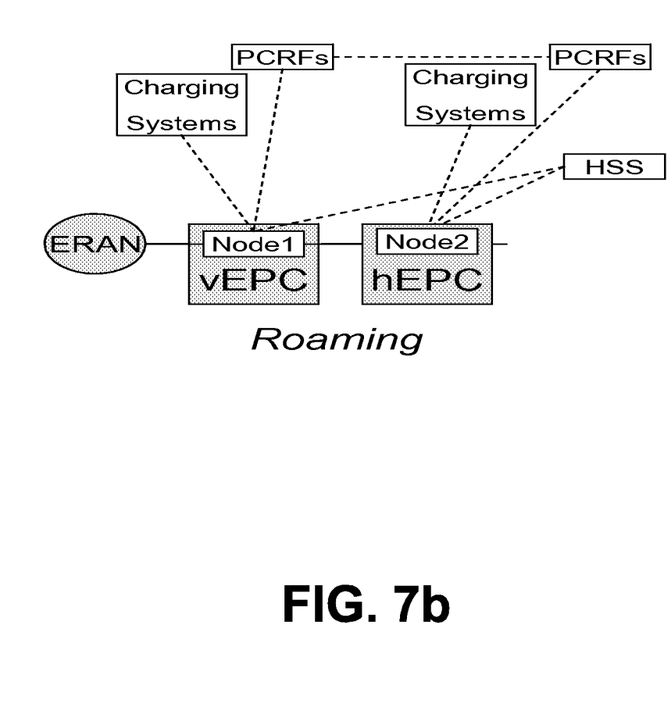

With reference now to FIG. 7a and FIG. 7b, which illustrate an SAE architecture with two distinct logical nodes Node 1 and Node 2 (Approach 1), two sets of logical interfaces have to be defined between EPC and the rest of the system for signalling functions related to the user plane processing within EPC. There has to be a policy control interface towards Node1 to be able to enforce policies in the visited network, and there has to be a policy control interface towards Node 2 to be able to enforce policies in the home PLMN.

In a Non Roaming case it is naturally possible to implement Node 1 and Node 2 in a single physical box. The logical architecture however assumes these two nodes to be separate and thus the logical interfaces to them, even if connected to a single physical entity, operate independently of each other.

The user data interface between Node 1 and Node 2 is used to route/switch/forward the user data between the two nodes. In this approach it is possible to have multiple Node2's at home network for a single user, in order to e.g. support access to multiple PDNs. In this approach access to PDNs directly from visited EPC (Node 1) (e.g. local breakout for emergency services) requires special arrangements as there is no Gi type of interface at Node1.

In this approach the Node1 may have some access related functionalities that are not present in Node2.

Figure 8A:
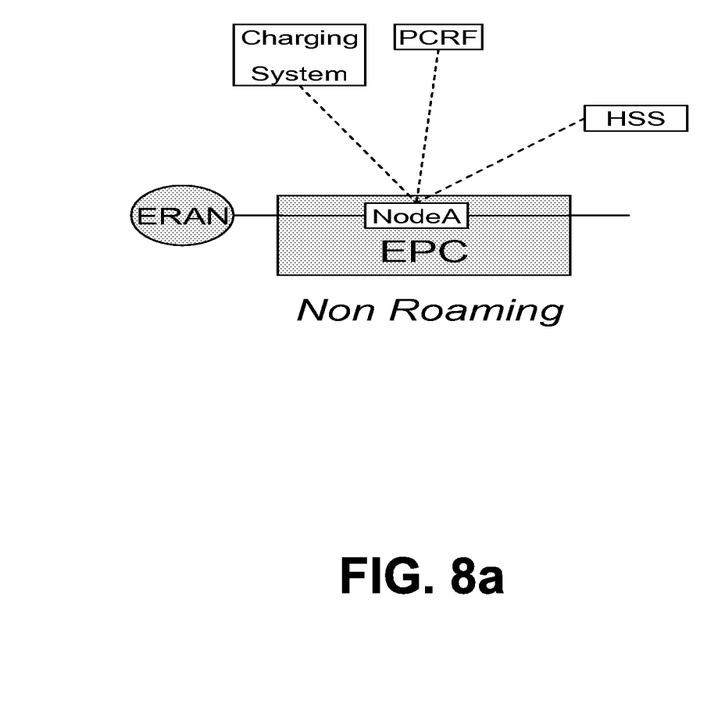
FIGS. 8a and 8b illustrates an exemplary SAE architecture with single logical node Node A.
Figure 8B:
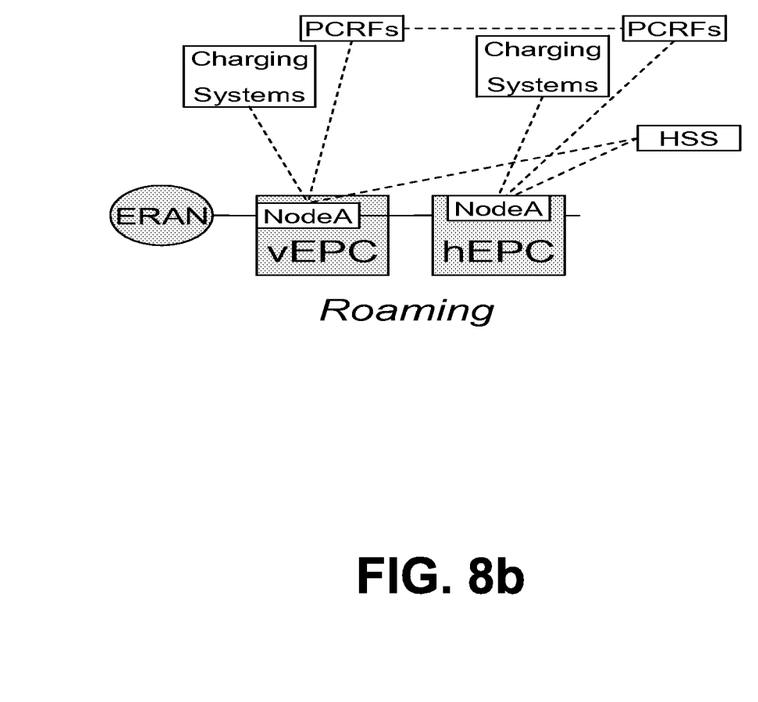

With reference now to FIG. 8a and FIG. 8b, which illustrate an SAE architecture with single logical Node A (approach 2), this system operates exactly in the same way for the roaming case as the two node system of Approach 1. For the non roaming case the logical architecture is however greatly simplified.

There is need for just one set of interfaces between the EPC and the rest of the system for signalling functions related to the user plane processing within EPC.

In cases where two distinct places for the user plane handling is needed, two occurrences of the same Node A can be inserted into the user data path. The subset of the possible SAE user plane handling procedures to be applied in each of these node occurrences can then depend on the carrier policy and the type of connection.

The user data interface between the first occurrence of NodeA and the second occurrence of Node A is used to route/switch/forward the user data traffic between the two nodes. There should be no difference between Approach 1 and Approach 2 related to the inter node user data interface.

In this approach it is possible to have multiple NodeAs in the home network for a single user e.g. to support access to multiple PDNs. There is no difference between Approach 1 and Approach 2 in this respect. In this approach access to PDNs directly from Node A at the visited network (e.g. local breakout for emergency services) is supported by default as the Node A already has a Gi type of interface.

In this approach the possible access related functions of Node A is used only in the Node A at visited network in regards to a specific connection through Node A.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus operable in a communication, comprising:
   a first logical entity adapted to provide a set of functions related to a connection through the communication system; and
   an instance of the first logical entity, the instance of the first logical entity being created from the first logical entity upon determining that the connection requires an additional logical entity, wherein
      said first logical entity and said instance of the first logical entity are connected in series, and
      each of the first logical entity and the instance of the first logical entity provide direct access to one or more networks via an interface associated with each entity.

2. The apparatus of claim 1, wherein the communication system is a System Architecture Evolution (SAE) communication system.

3. The apparatus of claim 1, wherein said logical entities are SAE anchors.

4. The apparatus of claim 1, wherein said connection requires an additional interface when said connection is an inter-network roaming connection.

5. The apparatus of claim 1, wherein said subset of functions includes one of: policy enforcement, data routing and switching, online charging, flow monitoring, or lawful interception.

6. A method used in a communication system, comprising:
   defining a first logical entity adapted to provide a set of functions related to a connection through the communication system; and
   determining whether the connection requires an additional logical entity, and upon determining that an additional logical entity is required:
      creating an instance of the first logical entity, said first logical entity and said instance of the first logical entity connected in series, and
   wherein each of the first logical entity and the instance of the first logical entity provide direct access to one or more networks via an interface associated with each entity.

7. The method of claim 6, wherein the communication system is a System Architecture Evolution (SAE) communication system.

8. The method of claim 6, wherein said logical entities are SAE anchors.

9. The method of claim 6, wherein said connection requires an additional logical entity when said connection is an inter-network roaming connection.

10. The method of claim 6, wherein said subset of functions includes one of: policy enforcement, data routing and switching, online charging, flow monitoring, or lawful interception.

11. A computer-readable medium comprising instructions which, when executed by a computer, cause the computer to perform operations including:
   defining a first logical entity adapted to provide a set of functions related to a connection through the communication system; and
   determining whether the connection requires an additional logical entity, and upon determining that an additional logical entity is required:
      creating an instance of the first logical entity, said first logical entity and said instance of the first logical entity connected in series, and
   wherein each of the first logical entity and the instance of the first logical entity provide direct access to one or more networks via an interface associated with each entity.

12. The computer-readable medium of claim 11, wherein the communication system is a System Architecture Evolution (SAE) communication system.

13. The computer-readable medium of claim 11, wherein said logical entities are SAE anchors.

14. The computer-readable medium of claim 11, wherein said connection requires an additional logical entity when said connection is an inter-network roaming connection.

15. The computer-readable medium of claim 11, wherein said subset of functions includes one of: policy enforcement, data routing and switching, online charging, flow monitoring, or lawful interception.

16. An apparatus operable in a wireless communication system, the apparatus comprising:
   a processor, configured for define a first logical entity adapted to provide a set of functions related to a connection through the communication system, determine whether the connection requires an additional logical entity, and upon determining that an additional logical entity is required, creating an instance of the first logical entity, said instance of the first logical entity and the first logical entity being connected in series, wherein each of the first logical entity and the instance of the first logical entity provide direct access to one or more networks via an associated interface; and
   a memory coupled to the processor for storing data.

17. The apparatus of claim 16, wherein the communication system is a System Architecture Evolution (SAE) communication system.

18. The apparatus of claim 16, wherein said logical entities are SAE anchors.

19. The apparatus of claim 16, wherein said connection requires an additional logical entity when said connection is an inter-network roaming connection.

20. The apparatus of claim 16, wherein said subset of functions includes one of: policy enforcement, data routing and switching, online charging, flow monitoring, or lawful interception.

21. An apparatus used in a communication system, comprising:
   means for defining a first logical entity adapted to provide a set of functions related to a connection through the communication system; and
   means for determining whether the connection requires an additional logical entity, and upon determining that an additional logical entity is required, further comprising:
      means for creating an instance of the first logical entity, said first logical entity and said instance of the first logical entity connected in series; and
   wherein each of the first logical entity and the instance of the first logical entity provide direct access to one or more networks via an interface associated with each entity.

22. The apparatus of claim 21, wherein the communication system is a System Architecture Evolution (SAE) communication system.

23. The apparatus of claim 21, wherein said logical entities are SAE anchors.

24. The apparatus of claim 21, wherein said connection requires an additional logical entity when said connection is an inter-network roaming connection.

25. The apparatus of claim 21, wherein said subset of functions includes one of: policy enforcement, data routing and switching, online charging, flow monitoring, or lawful interception.

* * * * *